(No Model.) 2 Sheets—Sheet 2.
G. LEISNER.
APPARATUS FOR MANUFACTURING GAS.
No. 426,823. Patented Apr. 29, 1890.
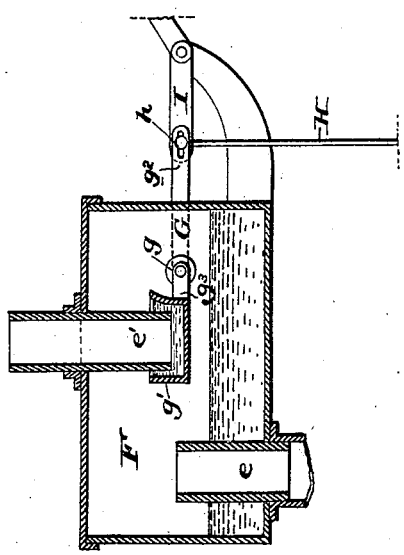
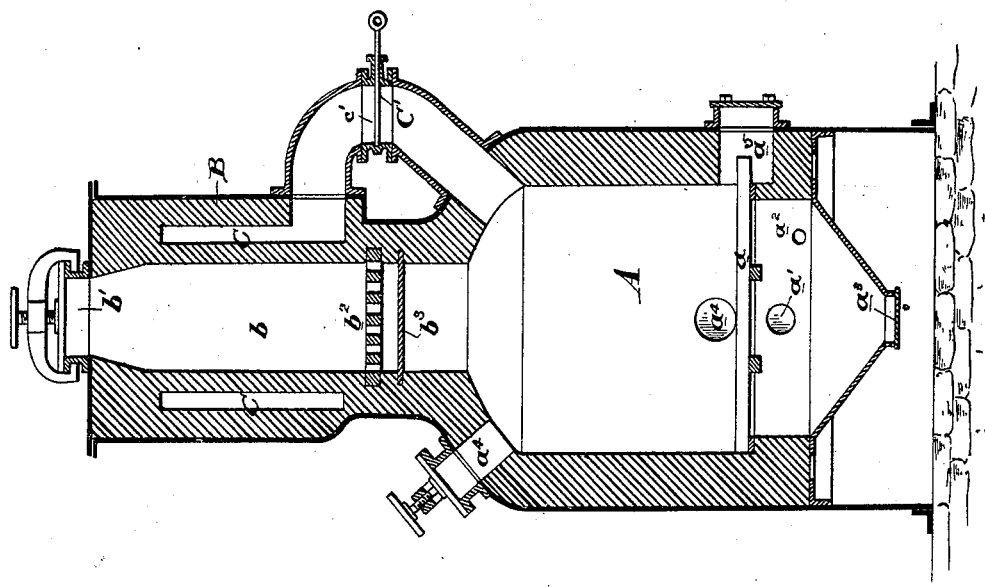
WITNESSES: INVENTOR:

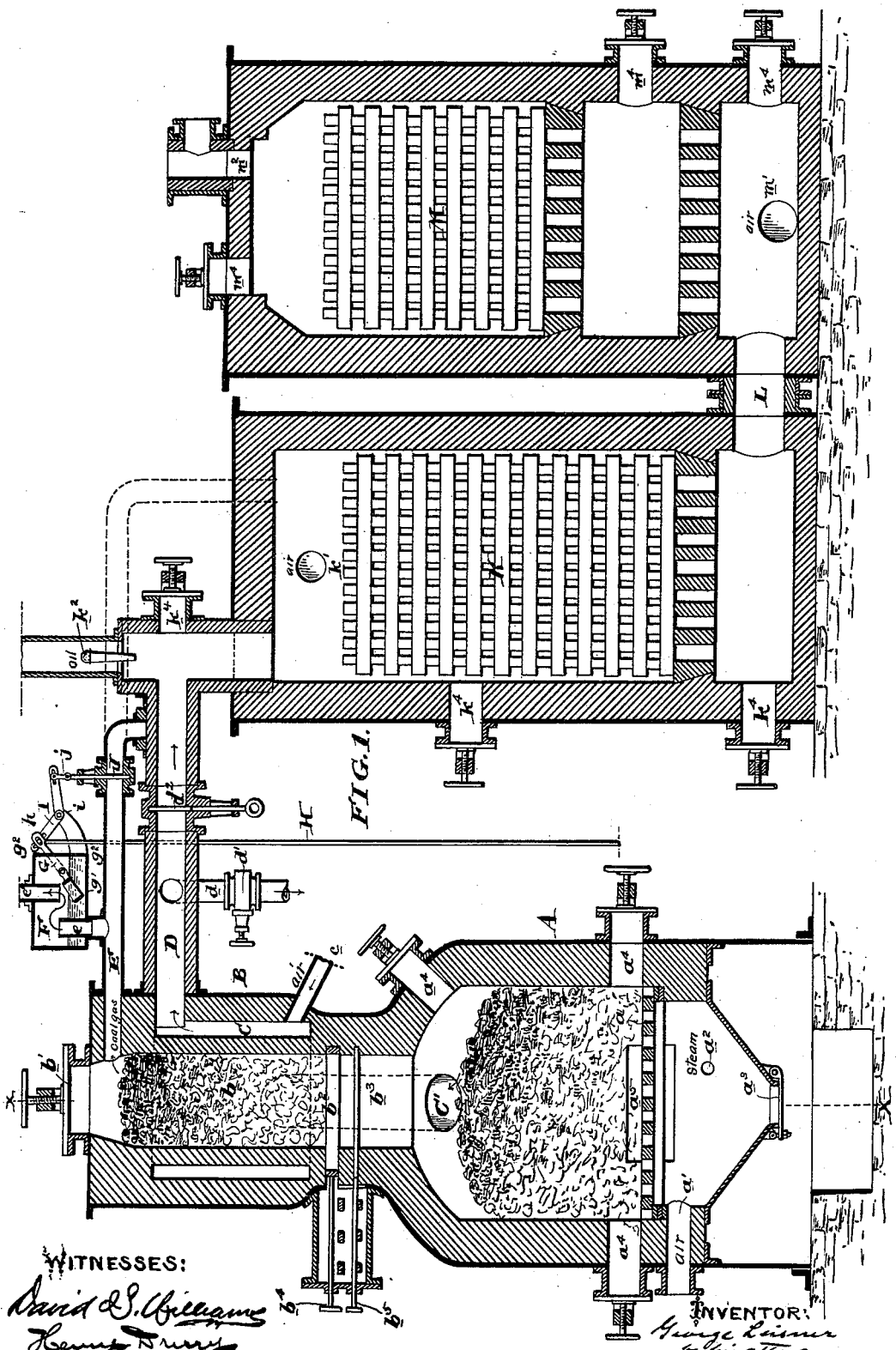

UNITED STATES PATENT OFFICE.

GEORGE LEISNER, OF PHILADELPHIA, PENNSYLVANIA, ASSIGNOR TO THE UNITED GAS IMPROVEMENT COMPANY, OF SAME PLACE.

APPARATUS FOR MANUFACTURING GAS.

SPECIFICATION forming part of Letters Patent No. 426,823, dated April 29, 1890.

Application filed December 24, 1889. Serial No. 334,905. (No model.)

*To all whom it may concern:*

Be it known that I, GEORGE LEISNER, of the city and county of Philadelphia, State of Pennsylvania, have invented a new and useful Improved Apparatus for Manufacturing Gas, of which the following is a true and exact description, reference being had to the accompanying drawings, which form a part of this specification.

My invention relates to apparatus for generating water-gas, and has for its object to provide a generator of improved construction whereby the gas may be driven off from the coal with which the generator is fed and saved more effectually and with better economical results than has heretofore been the case in apparatus with which I am familiar.

The novel features of my invention will be best understood as described in connection with the drawings in which they are illustrated, and in which—

Figure 1 is an elevation in section of a water-gas apparatus embodying my improvement. Fig. 2 is a section through the generator and the parts superimposed upon it on the line $xx$ of Fig. 1, and Fig. 3 is an enlarged view of the valve used to close the conduits $ee'$.

A is the generator, provided with the usual grate $a$ to support the fuel, an air-blast conduit $a'$, leading into its lower part, a steam-conduit $a^2$, also leading into its lower part, a door $a^3$ at its bottom to permit the exit of ash from time to time, man-holes $a^4$ conveniently arranged, and stoking-hole $a^5$. Upon the top of the generator is supported the structure B, containing a substantially vertical retort $b$, situated immediately above and in free communication with the generator. This retort is provided at its top with an opening closed by lid $b'$ or in any convenient way, through which fuel can be introduced from time to time. A chamber C is also formed in the structure B so as to surround the vertical retort $b$, and this chamber C is placed in communication with the generator in any convenient way, as by a conduit or pipe C'. A conduit D leads off from chamber C to a system of regenerative superheaters or fixing-chambers, (indicated in the drawings at K and N,) and a conduit E also leads off from the retort-chamber $b$.

All of the above-mentioned parts of my apparatus are substantially shown in various patents, publications, and structures with which I am familiar; but in all such older structures the fuel inserted in the vertical retort is supported by and forms a continuous body with the fuel in the generator and no provision is made for passing water-gas through the vertical retort or for saving all of the gases driven off from the coal. I am aware, also, that coal has been fed through vertical retorts externally heated, with closed bottom and gas-passages leading from them, and that such retorts have been arranged in convenient proximity to generators, so that the coke formed in them could be from time to time withdrawn and fed into the generator; but in such cases, also, no provision was made for passing water-gas through the retort, and for all operative purposes the generation of gases in the retort and in the generator were totally independent of each other.

Referring again to the drawings, $b^2$ is a movable grate arranged, as shown, to extend across the retort $b$ and afford a support for the coal inserted in it and having a handle $b^4$, by which it can be withdrawn in part or in whole, so as to let the fuel supported by it fall in part or altogether into the generator A.

$b^3$ is a valve extending across the retort $b$ beneath the grate $b^2$ and provided with a handle $b^5$, by which it can be withdrawn in whole or in part at will. Its function is to close the communication between the generator and the retort. The use of the movable grate and valve enables me to entirely close the retort-chamber $b$ with respect to the generator when fuel-gas is being generated therein, such gases passing through pipe C' into the chamber C, surrounding the retort, and escaping through the conduit D, while the gases generated from the coal in the retort $b$ escape through the conduit E and can be saved from and without admixture with fuel-gas, while at the same time as soon as the generator begins to manufacture water-gas by merely withdrawing the valve $b^3$ such water-gas will pass up into the retort $b$, mingling with the gases driven off from the coal and passing with such gases through conduit E to such point of storage, use, or further treatment as may be desired.

Preferably I provide a valve $c'$ in the passage leading from the generator to the chamber C, so that during the generation of water-gas the passage may be closed to compel all the gases to pass through the retort $b$, or partly closed, so that the greater part of the gas will pass through said retort-chamber and a small portion into the chamber C. I prefer also to lead an air-blast pipe $c$, Fig. 1, into the chamber C, so that the gases passing into it may be ignited and combustion kept up around the retort $b$. Where it is desired to maintain combustion in the chamber C during the generation of water-gas, as well as during the generation of fuel-gas, I provide escape-pipe $d$ in conduit D and a valve $d^2$ to close said conduit, so that the products of combustion can be led off through the passage or escape $d$. A valve $d'$ should be inserted in the conduit $d$, so that it can be closed whenever the main conduit D is open.

My invention is intended for use in connection with the ordinary system of regenerative fixing-chambers by which water-gas, together with other rich carbonaceous gases or vapors, are converted into a fixed gas. When so used, the conduits D and E both lead into the fixing-chambers, as shown in the drawings. The conduit E may lead directly into the fixing-chambers, as is shown by the dotted continuation of said conduit, or it may lead into the conduit D, as is shown by the full lines. In this combination I provide a conduit $e\ e'$, leading from conduit E, and valves to control this passage and to control the conduit E on the farther side of this passage. As shown in the drawings, the pipe $e$ leads into the bottom of box F, through the top of which the continuation $e'$ of the conduit consisting of pipes $e\ e'$ also leads. A lever G is secured to the end of a shaft $g$, which passes through the wall of the box F and has secured to it on the inside of the box an arm $g^3$, holding a cup $g'$, the said cup arranged directly beneath the open end of the pipe $e'$. The lower part of box F is filled with tar or some material of like nature, so that when the lever G is thrown up and the cup $g'$ down it will fill itself with tar, which, when the lever is pulled down and the cup pulled up, as shown in Fig. 3, will make a seal on the bottom of the pipe $e'$. On the outer end of the lever G a slot $g^2$ is formed, through which and a similar slot in a pivoted lever I a pin $h$, attached to a rod H, passes. The lever I is pivoted at $i$ and attached, as shown in Fig. 1, to a link $j$, extending from a sliding valve J, situated in the conduit E. The above-described arrangement is such that the valve's conduit $e\ e'$ and conduit E are simultaneously actuated in opposite directions—that is, so as to either open the conduit $e\ e'$ and close the conduit E, or to open the conduit E and close conduit $e\ e'$.

The regenerative fixing-chambers or superheaters (shown to the right of Fig. 1) are of the common character in water-gas apparatus and need not be particularly described. The gases pass from the generator into the top of the superheater K, where they mingle in the combustion-chamber at the top thereof with air introduced through the gas-passage $k'$, the burned gases passing down through the brick-work and out from the bottom of the chamber through passage L into a combustion chamber at the bottom of the superheater M, where more air is introduced through the gas-pipe $m'$, and the burning gases pass upward through the brick-work and out at the passage $m^2$, from which connection is made to any convenient stack which will carry off the products of combustion. When the generator is sufficiently ignited and the superheater sufficiently hot, steam is passed into the bottom of the generator and the water-gas resulting introduced into the superheaters in the same way as the fuel-gas previously introduced. Air, however, is of course shut off from the superheaters and in general oil is introduced, as by pipe $k^2$, to be vaporized and combined into a fixed gas with the water-gas by the action of the superheaters, the gases being drawn off finally through $m^2$ and conveyed to a point of storage or use. The parts marked $k^4$ and $m^4$ in the drawings are man-holes to permit convenient access to different parts of the superheaters.

My preferred mode of operating the improved apparatus is, after having properly charged the generator with fuel, to thrust the grate $b^2$ across the lower portion of the retort $b$ and close the valve $b^3$. I then charge a quantity of coal into the retort $b$ and close the charging-orifice at the top. The air-blast is then or previously, if desired, turned on in the generator and the fuel-gases pass through the conduit C', the valve $c'$ of which is open, into the chamber C, into which chamber, also, air is introduced through the blast-pipe $c$, so that combustion shall ensue around the retort $b$. The air introduced at this point, however, need be but small in quantity, as it is not desired to consume any large proportion of the gases in the chamber C, which, together with the retort $b$, can be heated to a considerable and essential degree even without combustion in chamber. The gases leave the chamber C through the conduit D and are delivered by it into the regenerative chambers K and M, in which they are completely burned, in order to heat the chambers for subsequent operations. While this is going on the conduit consisting of the pipes $e\ e'$, leading from pipe E, is opened and the pipe E closed in advance thereof, as shown in Fig. 1, so that all gases distilled from the coal in the retort $b$ pass through the pipes $e\ e'$, which convey them to a convenient receiver. (Not shown in the drawings.) This operation is continued until the fuel in the generator is thoroughly ignited and the superheating-chambers heated to a high degree. The air-blast is then shut off from the generator and steam introduced, the valve $b^3$ opened, the conduit $e\ e'$ closed, and the valve J in the conduit E opened. The water-gas generated in generator A can then pass upward through the retort $b$, and out of said retort it passes, together with coal-gases driven off from the coal, into conduit E, whence it is delivered, either directly or by means of a connection with conduit D, into the regenerative fixing-chambers or superheaters, through which it passes and is finally delivered to a receiver, (not shown,) oil, if desired, being injected to enrich the gases. Preferably I also close the valve $c'$ when making water-gas, so that no gases will pass from the generator into the chamber C. If desired, however, the valve $c'$ can be adjusted so that a small portion of the water-gas will pass from the generator into chamber C, and, the air-blast through $c$ being continued, combustion will ensue, or, rather, be maintained around the retort $b$. Where this is done it is necessary, in order to prevent admixture of products of combustion with the gases passing into the fixing-chamber, to provide a take-off pipe $d$ in conduit D and a valve $d^2$, by which the conduit can be closed on the farther side of the take-off. A valve $d'$ is of course provided in the take-off pipe $d$, so that it can be closed when the valve $d^2$ is opened.

If desired, a portion of the water-gas may be passed through the conduit $C'$, chamber C, and conduit D, while another portion is passing through the retort $b$, as already described. All that is necessary is then to cut off the air-blast through $c$, so that no combustion will take place in chamber C.

Having now described my invention, what I claim as new, and desire to secure by Letters Patent, is—

1. In a gas-generating apparatus, a water-gas generator A, in combination with a substantially vertical retort situated above it and opening freely therein, a feed-opening at the top of the retort, a movable grate $b^2$, arranged in the retort to sustain the coal, a valve $b^3$, arranged in the retort to control the communication between it and the generator, a conduit leading from the retort, a chamber C, communicating with the generator and surrounding the retort, and a conduit leading from the chamber C.

2. In a gas-generating apparatus, a water-gas generator A, in combination with a substantially vertical retort situated above it and opening freely therein, a feed-opening at the top of the retort, a movable grate $b^2$, arranged in the retort to sustain the coal, a valve $b^3$, arranged in the retort to control the communication between it and the generator, a conduit leading from the retort, a chamber C, communicating with the generator and surrounding the retort, an air-supply pipe $c$, leading into chamber C, and a conduit leading from the chamber C.

3. In a gas-generating apparatus, a water-gas generator A, in combination with a substantially vertical retort situated above it and opening freely therein, a feed-opening at the top of the retort, a movable grate $b^2$, arranged in the retort to sustain the coal, a valve $b^3$, arranged in the retort to control the communication between it and the generator, a conduit leading from the retort, a chamber C, communicating with the generator and surrounding the retort, a valve controlling the communication between chamber C and the generator, an air-supply pipe $c$, leading into chamber C, and a conduit leading from the chamber C.

4. In a gas-generating apparatus, the combination of a water-gas generator A, a substantially vertical retort $b$, situated above the generator, having a feed-opening at its top, and opening into the generator at its bottom, a movable grate $b^2$, to sustain the fuel in retort $b$, a valve $b^3$, to regulate the communication between the generator and retort, a chamber C, surrounding the retort $b$ and connected with generator A, a valve arranged to close and regulate the connection between the chamber C and generator A, a conduit D, leading from chamber C to regenerative fixing-chambers, a conduit E, leading from retort $b$ to said fixing-chambers, a passage $e$, leading from conduit E, a valve controlling passage $e$, a valve controlling conduit E on the farther side of passage $e$, and one or more regenerative fixing-chambers connected to conduits D and E.

5. In a gas-generating apparatus, the combination of a water-gas generator A, a substantially vertical retort $b$, situated above the generator, having a feed-opening at its top, and opening into the generator at its bottom, a movable grate $b^2$, to sustain the fuel in retort $b$, a valve $b^3$, to regulate the communication between the generator and retort, a chamber C, surrounding the retort $b$ and connected with generator A, an air-supply pipe $c$, leading into chamber C, a valve arranged to close and regulate the connection between the chamber C and generator A, a conduit D, leading from chamber C to regenerative fixing-chambers, a conduit E, leading from retort $b$ to said fixing-chambers, a passage $e$, leading from conduit E, a valve controlling passage $e$, a valve controlling conduit E on the farther side of passage $e$, and one or more regenerative fixing-chambers connected to conduits D and E.

GEORGE LEISNER.

Witnesses:
S. LEWIS CRAMER,
C. R. COLLINS.